United States Patent
Santosuosso (10) Patent No.: US 7,340,448 B2
(45) Date of Patent: Mar. 4, 2008

(54) METHOD, APPARATUS, AND COMPUTER PROGRAM PRODUCT FOR IMPLEMENTING ENHANCED QUERY GOVERNOR FUNCTIONS

(75) Inventor: John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 10/712,743

(22) Filed: Nov. 13, 2003

(65) Prior Publication Data

US 2005/0108188 A1    May 19, 2005

(51) Int. Cl.
   *G06F 17/30* (2006.01)
(52) U.S. Cl. .................. 707/3; 707/2; 707/4; 707/5; 707/6
(58) Field of Classification Search ............. 707/1–5, 707/10, 6
   See application file for complete search history.

(56) References Cited

U.S. PATENT DOCUMENTS 6,944,614 B1 *   9/2005   Ramasamy et al. ............ 707/4
2005/0177557 A1 *   8/2005   Ziauddin et al. ............... 707/3

OTHER PUBLICATIONS

Brownbridge et al., Oracle Discoverer 4i Plus, copyright 2000, http://octrials.nci.nih.gov/discwb4/applet/help/userguide/output/toc.htm, pp. 1-32.*

Rankins et al., Microsoft SQL Server 2000 Unleashed, Dec. 2002, Sams, Second Edition, pp. 1-19.*

* cited by examiner

*Primary Examiner*—Hung Q Pham
(74) *Attorney, Agent, or Firm*—Joan Pennington (57) ABSTRACT

A method, apparatus and computer program product are provided for implementing enhanced query governor functions. Query execution includes first checking for a timeout value for a query. Responsive to identifying a timeout value for the query, an execution time for the query is reset and a monitor for each timeout value for the query is started. Then the execution of the query is started. The execution of predefined events is monitored during the execution of the query. The predefined events include a begin or end of processing of at least one of a trigger and a user defined function (UDF). Execution status of the query is periodically checked. Responsive to identifying the query is executing, checking for any expired timeout value is performed. The execution of the query is halted responsive to an identified expired timeout value.

5 Claims, 7 Drawing Sheets

UDF AND TRIGGER DATA TABLE 126

| START TIME 602 | STOP TIME 604 | EVENT 606 (UDF OR TRIGGER) |
|---|---|---|

METHOD, APPARATUS, AND COMPUTER PROGRAM PRODUCT FOR IMPLEMENTING ENHANCED QUERY GOVERNOR FUNCTIONS

FIELD OF THE INVENTION

The present invention relates generally to the database management field, and more particularly, relates to a method, apparatus and computer program product for implementing enhanced query governor functions.

DESCRIPTION OF THE RELATED ART

Databases are computerized information storage and retrieval systems. Databases are managed by systems and may take the form of relational databases and hierarchical databases. A Relational Database Management System (RDBMS) is a database system that uses relational techniques for storing and retrieving data. Relational databases are organized into tables consisting of rows (tuples) and columns of data. A relational database typically includes many tables, and each table includes multiple rows and columns. The tables are conventionally stored in direct access storage devices (DASD), such as magnetic or optical disk drives, for semi-permanent storage.

Relational Database Management System (RDBMS) software using a Structured Query Language (SQL) interface is well known in the art. The SQL interface has evolved into a standard language for RDBMS software and has been adopted as such by both the American Nationals Standard Organization (ANSI) and the International Standards Organization (ISO).

A database management system (DBMS) typically includes some form of query governor. Known query governors typically enable a database administrator and user of the database to have queries time out if the queries take too long. In this case queries are prevented from taking up too much system resources.

Current technology simply allows the database user to time out a query based upon execution time but does take into account multiple aspects or the breakdown of a query into executing components.

A need exists for a mechanism to enable the database user to be allowed to modify multiple query attributes including multiple executing components of a query. It is desirable that a query can be broken down into multiple query execution components, for example, data retrieval, trigger processing, and user defined function (UDF) processing, and with each of these query execution components having an individual time out value.

SUMMARY OF THE INVENTION

A principal object of the present invention is to provide a method, apparatus and computer program product for implementing enhanced query governor functions. Other important objects of the present invention are to provide such method, apparatus and computer program product for implementing enhanced query governor functions substantially without negative effect and that overcome many of the disadvantages of prior art arrangements.

In brief, a method, apparatus and computer program product are provided for implementing enhanced query governor functions. Query execution includes first checking for a timeout value for a query. Responsive to identifying a timeout value for the query, an execution time for the query is reset and a monitor for each timeout value for the query is started. Then the execution of the query is started. The execution of predefined events is monitored during the execution of the query. The predefined events include a begin or end of processing of at least one of a trigger and a user defined function (UDF). Execution status of the query is periodically checked. Responsive to identifying the query is executing, checking for any expired timeout value is performed. The execution of the query is halted responsive to an identified expired timeout value.

In accordance with features of the invention, empirical data for trigger processing and UDF processing is used to determine whether in most likelihood that the query can finish within set timeout values for the trigger and user defined function (UDF), and execution of the query is started only responsive to determining in most likelihood the query can finish within the timeout values.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
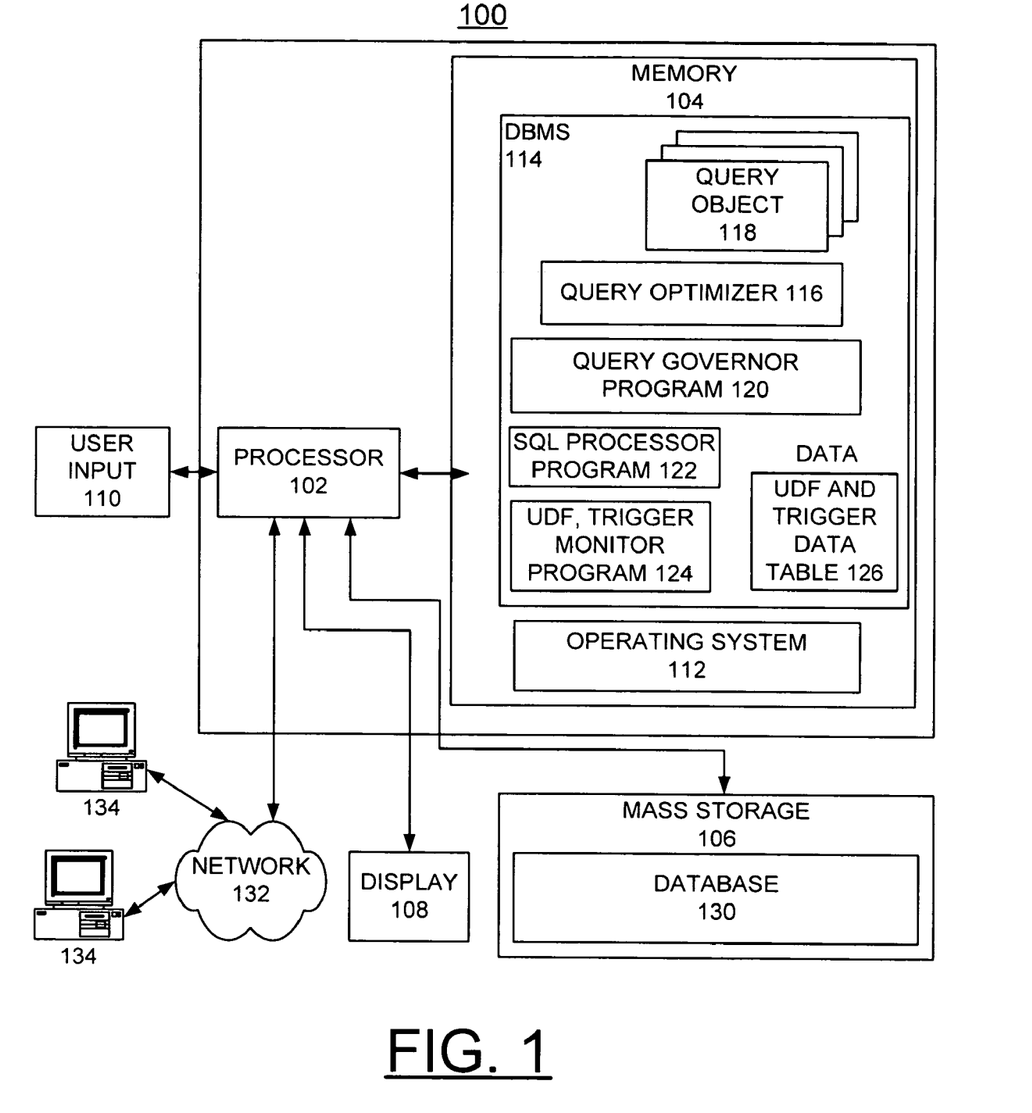
FIG. 1 is a block diagram illustrating a computer system for implementing methods for processing enhanced query governor functions in accordance with the preferred embodiment.

Referring now to the drawings, in FIG. 1 there is shown a computer system generally designated by the reference character 100 for implementing methods for processing enhanced query governor functions in accordance with the preferred embodiment. Computer system 100 includes a processor 102 coupled to a memory 104. Computer system 100 includes a mass storage 106, such as a direct access storage device (DASD), a display 108, and a user input 110 coupled to the processor 102.

Computer system includes an operating system 112, a database management system 114 including a query optimizer 116 and a query object 118. The query object 118 includes a number of methods or plans capable of performing specific operations relevant to management of the query object and the execution of a query represented by such an object. Database management system 114 includes a query governor program 120 of the preferred embodiment including a SQL processor program 122 and a user defined function (UDF) and trigger monitor program 124, and a UDF and trigger data table 126. Computer system includes a database 130 stored in the mass storage 106, and a local area network (LAN) or wide area network (WAN) 132 that couples I/O devices 134, such as personal computers to the computer system 100. Computer system 100 is shown in simplified form sufficient for an understanding of the present invention.

In accordance with features of the preferred embodiment, query governor program 120 of the preferred embodiment includes the SQL processor program 122 and UDF and trigger monitor program 124. The query governor programs 120, 122, 124 enable the database administrator and users of the database to modify query attributes and to monitor and maintain empirical data for implementing enhanced query governor functions of the preferred embodiment. With the query governor programs 120, 122, 124, the components of a query are broken down into query execution, i.e., data retrieval, trigger processing, and user defined function (UDF) processing. The database user is allowed to break down a query into multiple executing components or individual pieces, each with individual time out values. Empirical data for multiple query attributes, such as how long UDFs and triggers take to execute, is maintained in accordance with features of the preferred embodiment.

Advantages are provided by the enhanced query governor functions of the preferred embodiment. For example, the database administrator or user is enabled to modify query attributes, such as turning off certain trigger processing and changing a web service UDF.

It should be understood that the present invention is not limited for use with the illustrated computer system 100. The illustrated processor system 100 is not intended to imply architectural or functional limitations. The present invention can be used with various hardware implementations and systems and various other internal hardware devices, for example, multiple main processors.

Various commercially available processors could be used for computer system 100, for example, an AS/400 or iSeries computer system manufactured and sold by International Business Machines Corporation.

Referring to FIGS. 2, 3, 4, and 5 there are shown exemplary steps performed by the computer system 100 for implementing methods for processing enhanced query governor functions in accordance with the preferred embodiment. The query governor program 120 including SQL processor program 122 and UDF and trigger monitor program 124 of the preferred embodiment perform the exemplary steps for processing enhanced query governor functions in accordance with the preferred embodiment.

Figure 2:
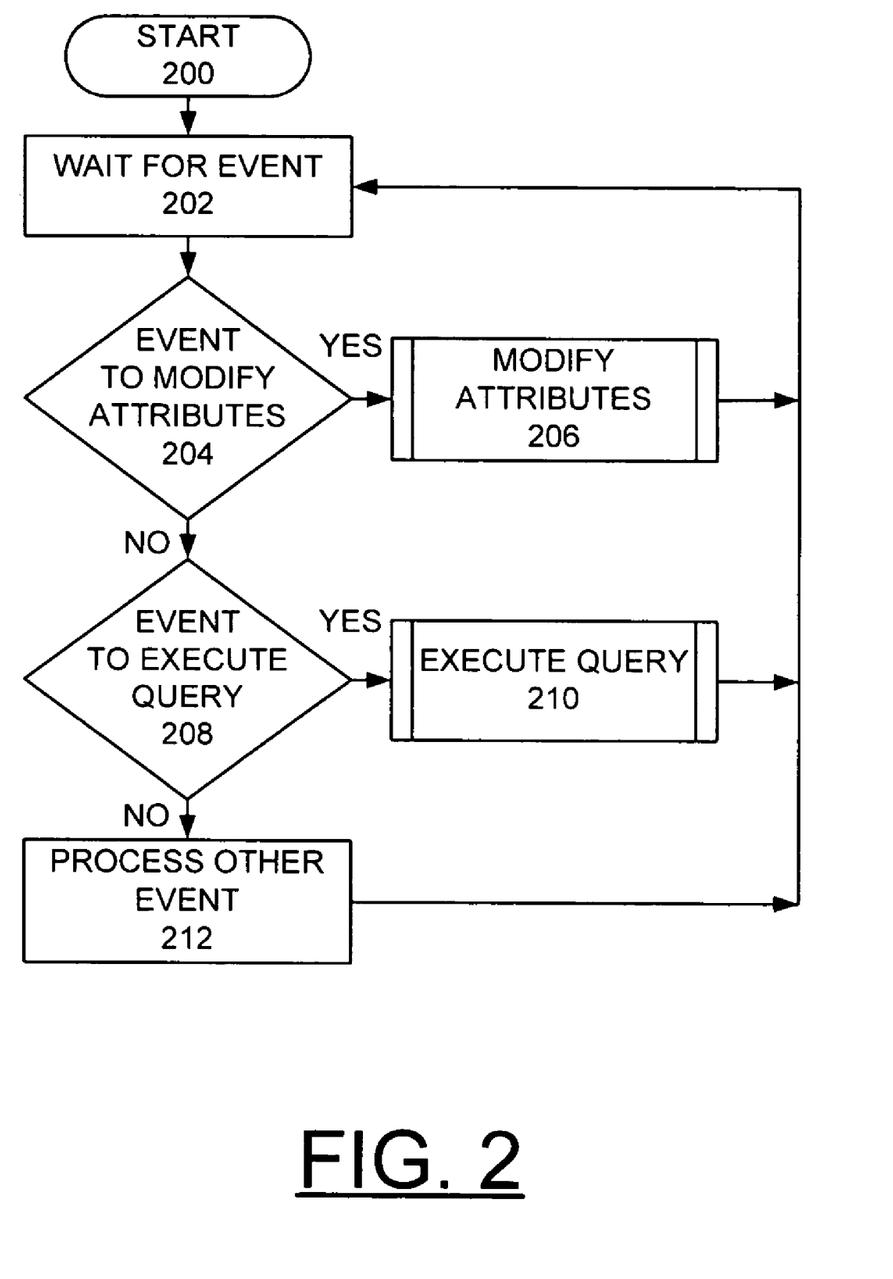
FIGS. 2, 3, 4, and 5 are flow charts illustrating exemplary steps performed by the computer system of FIG. 1 for implementing enhanced query governor functions in accordance with the preferred embodiment.

Referring first to FIG. 2, there are shown exemplary steps of the SQL processor program 122 starting at a block 200 for handling SQL events. First, waiting for an event is provided as indicated in a block 202. When an event is received, checking to determine if the received event is to modify query attributes as indicated in a decision block 204. If so, then a modify attributes routine is performed as indicated in a block 206. The modify attributes routine is illustrated and described with respect to FIG. 4. Otherwise, if the received event is not to modify query attributes, checking whether the event is an event to execute a query is performed as indicated in a decision block 208. If so, then an execute query routine is performed as indicated in a block 210. The execute query routine is illustrated and described with respect to FIG. 3. Otherwise, if not an event to execute a query, then any other known SQL event known in the art is processed as indicated in a block 212. Then the sequential operations return to block 202 to wait for another event.

Figure 3:
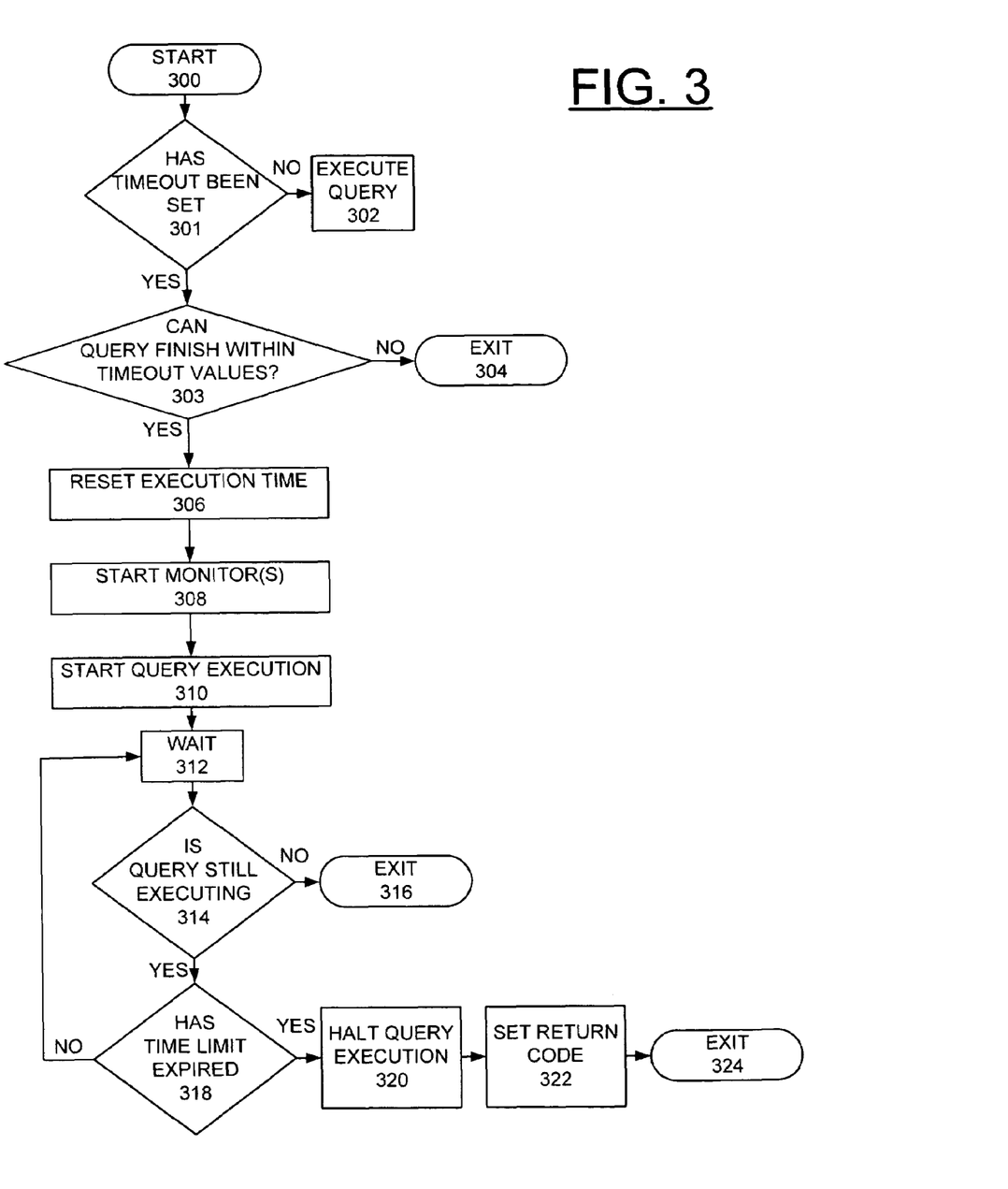

Referring now to FIG. 3, there are shown exemplary steps of the execute query routine starting at a block 300 for handling execution of queries. Before starting to process the query, checking to determine if any timeouts exist for this query is performed as indicated in a decision block 301. Any timeouts for this query are set through changing the query attributes using the modify attributes routine of FIG. 4. If no timeouts exist, then the query is executed as known in the art as indicated in a block 302. If a timeout exists, then checking to determine based on empirical data whether in most likelihood that the query can finish within the timeout values is performed as indicated in a decision block 303. If in most likelihood the query will not finish within the timeout values, then the query is not even started and the sequential steps end or exit as indicated in a block 304. Otherwise if determined that the query can finish within the timeout values, then the execution time is reset for each timeout as indicated in a block 306 and monitors are set as indicated in a block 308. A monitor in this case is one that will track processing time of a user defined function (UDF) and/or a trigger. The monitor or monitors track the timeout values previously set.

Then the execution of the query is started as indicated in a block 310. After starting the execution of the query in a separate thread, this main thread then waits a predetermined period of time as indicated in a block 312. This predetermined period of time or time value is a sub-factor of the timeout value. This means if a limit of 10 seconds is set for UDF processing, then the predetermined period of time for the wait limit will be a division of 10 seconds, such that a wake up is set for checking if the query is still executing as indicated in a decision block 314. If the query is not executing, then the sequential steps end or exit as indicated in a block 316 because the query is done executing. Otherwise, checking whether the time limit has expired is performed as indicated in a decision block 318. If any of the timeouts has been reached, then execution of the query is halted as indicated in a block 320 and a return code is set as indicated in a block 322. Then the sequential steps end or exit as indicated in a block 324. Otherwise if no time limit has expired at decision block 318, then the sequential steps return to block 312 to wait for the predetermined period of time.

Figure 4:
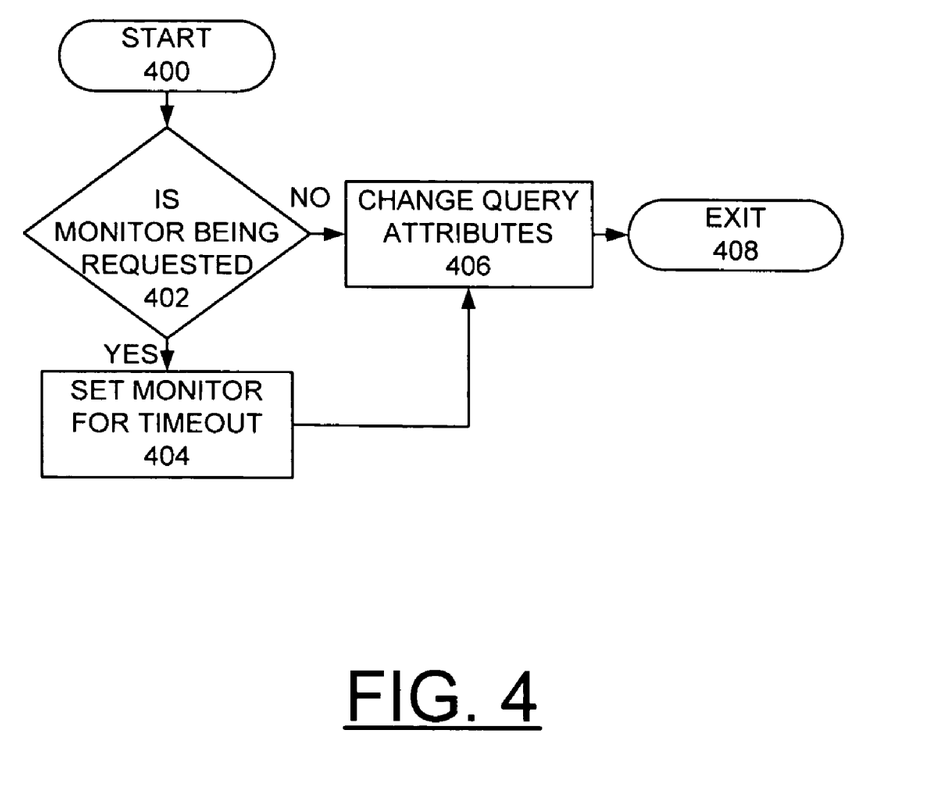

Referring now to FIG. 4, there are shown exemplary steps of the modify attributes routine starting at a block 400 to set query attributes. First checking to determine if a monitor is being requested is performed as indicated in a decision block 402. If so, then the monitor is set for a timeout as indicated in a block 404. Then as indicated in a block 406, the rest of the query attributes are changed as known in the art. Then the sequential steps end or exit as indicated in a block 408. Otherwise if a monitor is not being requested, then the rest of the query attributes are changed as known in the art at block 406 and the sequential steps exit at block 408.

As described with respect to block 406 in FIG. 4, enhanced query governor functionality is being added to the known or existing art of changing query attributes. Changing query attributes generally allows for various other query functionalities; that-is used in accordance with features of the preferred embodiment to set timeout values for UDF processing and trigger processing.

Figure 5:
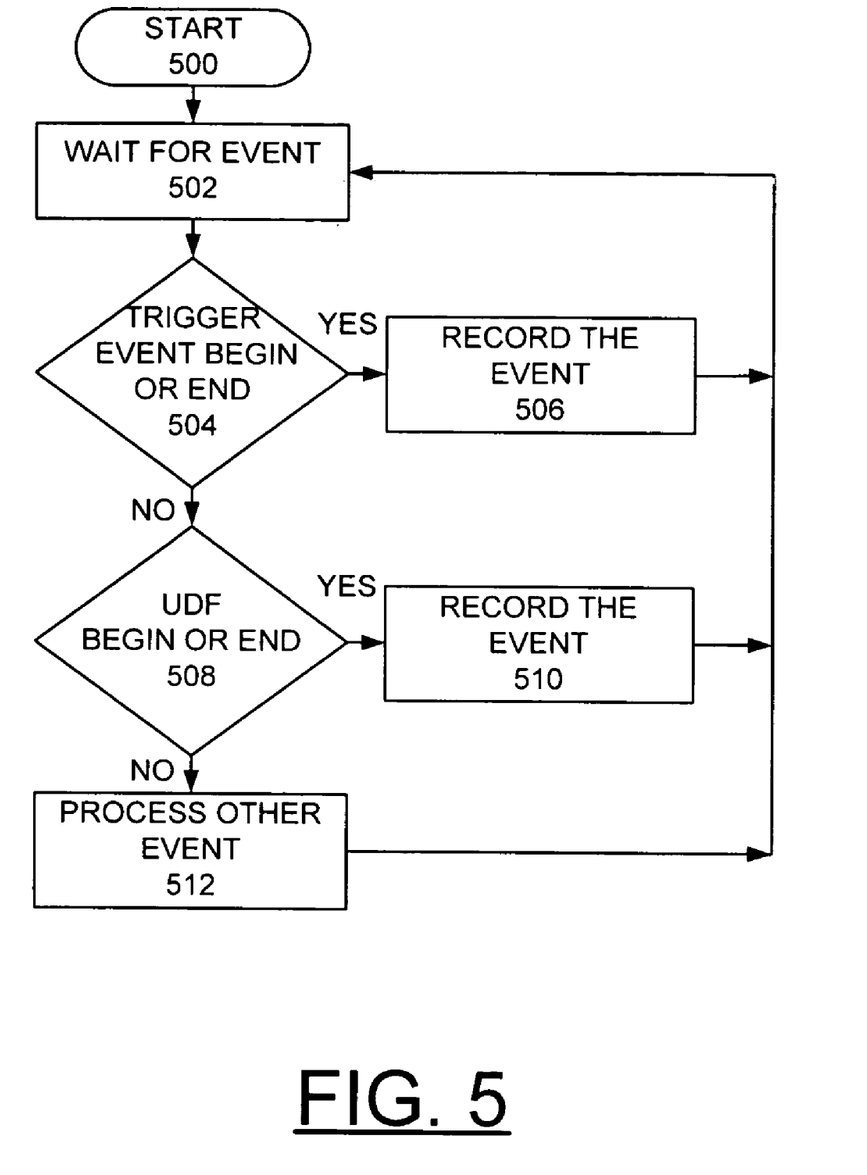

Referring now to FIG. 5, there are shown exemplary steps of the UDF and trigger monitor program 124 starting at a block 500 for monitoring the execution of each UDF and each trigger such that empirical data can be maintained on how long the UDFs and triggers take to execute. First, waiting for an event is provided as indicated in a block 502. When an event is received, checking to determine if the received event is a trigger event begin or end as indicated in a decision block 504. If so, then the trigger event and start or stop time is recorded as indicated in a block 506. Otherwise when the received event is not a trigger event, checking to determine if the received event is a UDF event begin or end as indicated in a decision block 508. If so, then the UDF event and start or stop time is recorded as indicated in a block 510. Otherwise, if not a trigger or UDF event begin or end, then any other known SQL event known in the art is processed as indicated in a block 512. Then the sequential operations return to block 502 to wait for another event.

Figure 6:
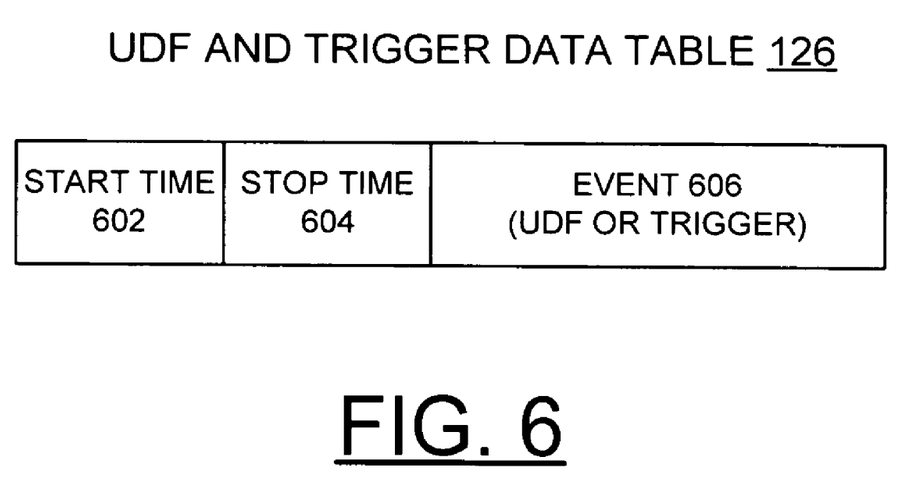
FIG. 6 is a diagram illustrating an exemplary data table for storing UDF and trigger data in accordance with the preferred embodiment.

Referring now to FIG. 6, there is shown an exemplary data table 126 for storing UDF and trigger data in accordance with the preferred embodiment. The UDF and trigger data table 126 stores a start time 602, a stop time 604, and an event 606, either a UDF event or a trigger event. The UDF and trigger data table 126 contains the start and stop times 602, 604 for UDFs and triggers 606 that is kept up to date by the processing performed as shown in the flow chart of FIG. 5.

Figure 7:
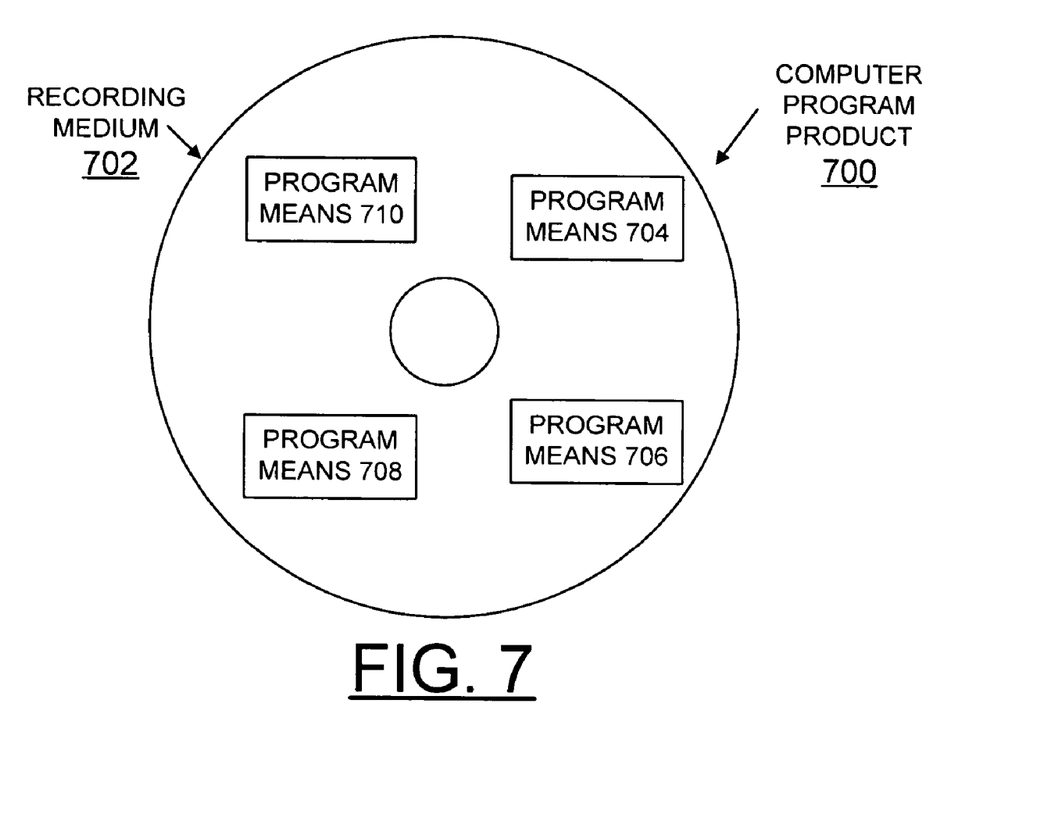
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for implementing enhanced query governor functions of the preferred embodiment in the system 100 of FIG. 1.

A sequence of program instructions or a logical assembly of one or more interrelated modules defined by the recorded program means 704, 706, 708, 710, direct the computer system 100 for processing enhanced query governor functions of the preferred embodiment.

While the present invention has been described with reference to the details of the embodiments of the invention shown in the drawing, these details are not intended to limit the scope of the invention as claimed in the appended claims.

What is claimed is:

1. A method for implementing enhanced query governor functions using a computer system for providing enhanced performance for said computer system, said computer system performing said method comprising the steps of:
   receiving a query;
   breaking down the received query into query execution components, wherein the query execution components comprises query data retrieval processing, user defined function (UDF) processing and trigger processing;
   monitoring events, wherein the monitored events comprising at least an event to modify attributes and an event to execute query;
   responsive to the monitored event to modify attributes, performing a modify attributes routine, said performing the modify attributes routine including checking for a monitor being requested, and responsive to the monitor being requested, setting timeout values for the requested monitor, wherein the requested monitor checking the user defined function (UDF) processing and the trigger processing against the set timeout values;
   responsive to the monitored event to execute query, performing an execute query routine, said performing the execute query routine including checking for a timeout value for the query data retrieval and checking for the set timeout values performed by the modify attributes routine;
   responsive to an identified timeout value for the query data retrieval, resetting an execution time for the query;
   starting the requested monitor;
   starting the execution of the query;
   monitoring the execution of predefined events during the execution of the query; said predefined events including a begin or end of processing of each requested monitor;
   storing start and end processing time of the user defined function (UDF) processing and the trigger processing in a table;
   periodically checking execution status of the query;
   checking for an expired timeout value for the query data retrieval and for the requested monitor; and
   halting the execution of the query responsive to an identified expired timeout value.

2. The method for implementing enhanced query governor functions as recited in claim 1 wherein the step of monitoring the execution of said predefined events includes the step of recording empirical data for said trigger processing, and said user defined function (UDF) processing.

3. The method for implementing enhanced query governor functions as recited in claim 2 includes the step of checking to determine based upon said recorded empirical data whether in most likelihood that the query can finish execution within the set timeout values for the requested monitor, and responsive to determining in most likelihood the query will not finish execution within said set timeout values for the requested monitor, execution of the query is not started.

4. The method for implementing enhanced query governor functions as recited in claim 1 includes the step responsive to halting the execution of the query, setting return code values for said identified expired timeout value for processing said UDF processing, said trigger processing, and the query data retrieval.

5. The method for implementing enhanced query governor functions as recited in claim 1 wherein said modify attributes routine further includes the step of changing query attributes.

* * * * *